US007889475B2

(12) United States Patent
Chen et al.

(10) Patent No.: US 7,889,475 B2
(45) **Date of Patent: *Feb. 15, 2011**

(54) POWER STRIP HAVING SURGE PROTECTIVE DEVICES

(75) Inventors: Kuang-Che Chen, Taipei (TW); Yi-Te Chiang, Taipei (TW)

(73) Assignee: Primax Electronics Ltd., Taipei (TW)

( * ) Notice: Subject to any disclaimer, the term of this patent is extended or adjusted under 35 U.S.C. 154(b) by 337 days.

This patent is subject to a terminal disclaimer.

(21) Appl. No.: 12/191,401

(22) Filed: Aug. 14, 2008

(65) Prior Publication Data

US 2009/0207541 A1 Aug. 20, 2009

(30) Foreign Application Priority Data

Feb. 14, 2008 (CN) ........................ 2008 1 0005641

(51) Int. Cl.
*H02H 9/06* (2006.01)
*H02H 3/22* (2006.01)

(52) U.S. Cl. ........................................................ 361/118

(58) Field of Classification Search .................. 361/118
See application file for complete search history.

(56) References Cited

U.S. PATENT DOCUMENTS

| | | | | |
|---|---|---|---|---|
| 5,414,587 | A * | 5/1995 | Kiser et al. | 361/118 |
| 5,761,021 | A * | 6/1998 | Yu | 361/111 |
| 2004/0160722 | A1* | 8/2004 | Miller, Jr. | 361/118 |
| 2007/0086141 | A1* | 4/2007 | Elms | 361/118 |

* cited by examiner

*Primary Examiner*—Ronald W Leja
(74) *Attorney, Agent, or Firm*—Kirton & McConkie; Evan R. Witt

(57) ABSTRACT

The present invention provides a power strip having surge protective device. The power strip includes a first surge protective device, a buffer conductive device and a second surge protective device. When a surge is inputted into the power strip, the surge is subject to two-stage suppressions so as to protect the electrical appliances which are electrically connected to the power strip.

6 Claims, 5 Drawing Sheets

POWER STRIP HAVING SURGE PROTECTIVE DEVICES

FIELD OF THE INVENTION

The present invention relates to a power strip, and more particularly to a power strip having surge protective devices.

BACKGROUND OF THE INVENTION

Generally, conventional power strips are susceptible to transient surge voltages resulting from lightning strike. For preventing the transient surge voltages from damaging the electrical appliances which are electrically connected to the power strip, the conventional power strip usually has a surge protective device for preventing damage of electrical appliances.

FIG. 1A is a schematic view illustrating a conventional power strip. As shown in FIG. 1A, the power strip 10 comprises a plug device 101, a conducting line 102 and a power strip main body 103. The power strip main body 103 includes a surge protective device 1031 and a plurality of electrical sockets 1032.

FIG. 1B is a schematic circuit diagram illustrating the surge protective device of the power strip shown in FIG. 1A. The surge protective device 1031 of FIG. 1B principles includes three metal oxide varistors (MOV) MOV1, MOV2, MOV3, and two thermal fuses F1, F2. When a surge is inputted into one of the Line terminal 1011, the Neutral terminal 1012 and the Ground line 1013, the surge will be transmitted to one of the other two terminals through the path R1, R2 or R3. Under this circumstance, the surge will not flow through the electrical sockets 1032 so as to protect the electrical appliances which are electrically connected to the electrical sockets 1032.

For example, if a surge is inputted into the power strip 10 through the Line terminal 1011, the surge will be successively transmitted through the thermal fuse F1 and the metal oxide varistor MOV1 and outputted from the Neutral terminal 1012. When the surge is received by the metal oxide varistor MOV1, the inherent high impedance of the metal oxide varistor MOV1 will become low impedance. Since a low impedance path R1 is defined, the surge will be transmitted to the Neutral terminal 1012 through the low impedance path R1.

Recently, as the requirements for electrical safety of electrical appliances become more stringent, stringent safety regulations associated with surge protective device are provided. Underwriters Laboratories Standard for Safety for Transient Voltage (UL 1449) is the primary safety standard for testing surge protective device. The second edition of UL 1449 proposes a lightning strike simulation test. In accordance with the lightning strike simulation test, when a voltage of 6,000 volts and a current of 500 amperes are inputted into an electrical appliance having a surge protective device, the surge protective device should exhibit a clamping voltage less than 330 volts.

On Sep. 29, 2006, UL 1449 has recently been revised, and will be introduced as a third edition. In accordance with the lightning strike simulation test proposed in the third edition of UL 1449, the surge protective device should also exhibit a clamping voltage less than 330 volts even if the test condition become more stringent (i.e. 6,000 volts, 3,000 amperes). Experiments demonstrate that most surge protective devices meeting the requirements of the second edition of UL 1449 exhibit a clamping voltage larger than 400 volts. In other words, the surge protective devices of the conventional power strips fail to meet the requirements of the third edition of UL 1449.

Therefore, there is a need of providing a power strip having a surge protective device to meet the requirements of the third edition of UL 1449 while having the advantages of simplified configuration, cost-effectiveness and industrial utility.

SUMMARY OF THE INVENTION

It is an object of the present invention to provide a power strip having a surge protective device, in which the surge is suppressed in multiple stages so as to protect the electrical appliances which are electrically connected to the power strip.

Another object of the present invention provides a power strip having a surge protective device, in which the power strip has the advantages of simplified configuration and cost-effectiveness.

In accordance with an aspect of the present invention, there is provided a power strip having surge protective devices for suppressing a surge and protecting an electrical appliance which is connected to the power strip. The power strip includes a plug device, a buffer conductive device and a power strip main body. The plug device includes a plurality of pins to be inserted into a power socket and a first surge protective device for initially suppressing the surge. The buffer conductive device has an end connected to the first surge protective device for providing a buffer conductive path for delaying the duration of transferring the surge. The power strip main body includes a second surge protective device and a plurality of electrical sockets. The electrical sockets are connected to the electrical appliance. The second surge protective device is connected to the other end of the buffer conductive device for receiving and further suppressing the surge.

In an embodiment, the buffer conductive device is a conducting wire covered with insulating material.

In an embodiment, the plug device comprises a plug part and the first surge protective device, wherein the plug part is connected to the first surge protective device, and the plug part contains the plurality of pins.

In an embodiment, the plug device includes a first plug part and a second plug part, wherein the first plug part is connected to the second plug part, and the second plug part contains the plurality of pins and the first surge protective device.

In an embodiment, the first surge protective device is a metal oxide varistor (MOV), a gas discharge tube (GDT) or a transient voltage suppressor (TVS).

In an embodiment, the second surge protective device is a metal oxide varistor (MOV), a gas discharge tube (GDT) or a transient voltage suppressor (TVS).

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 2:
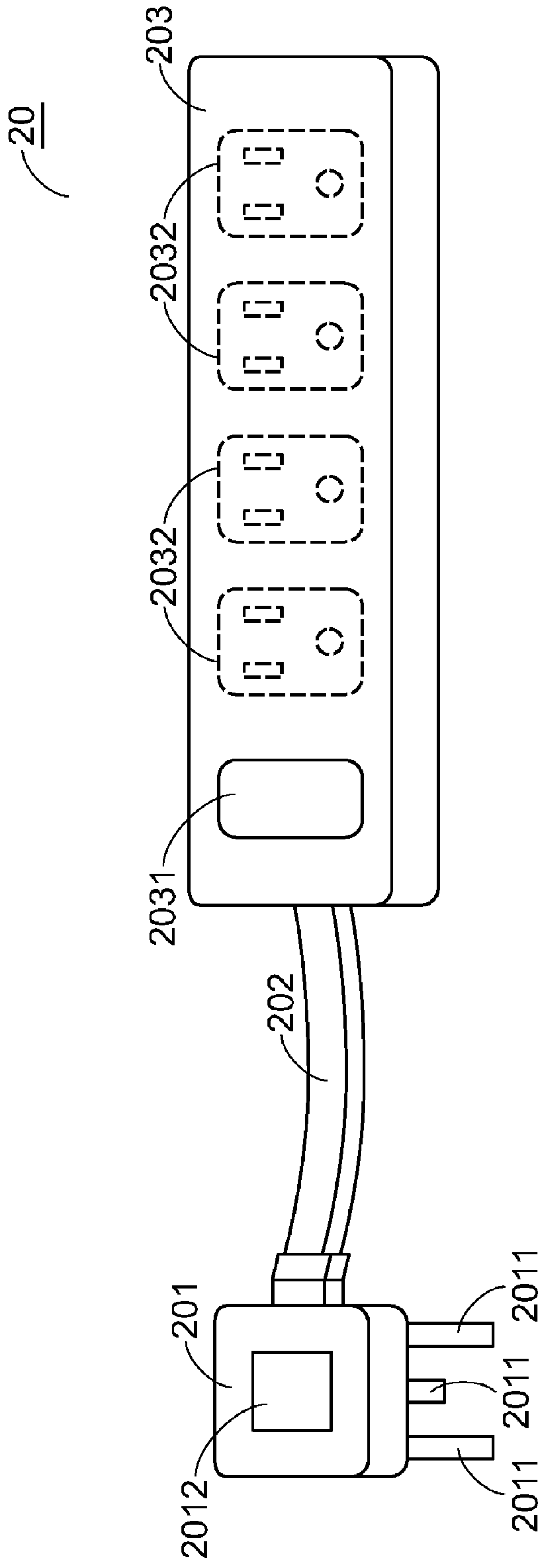
FIG. 2 is a schematic view illustrating a power strip having surge protective devices according to a first preferred embodiment of the present invention.

FIG. 2 is a schematic view illustrating a power strip having surge protective devices according to a first preferred embodiment of the present invention. As shown in FIG. 2, the power strip 20 includes a plug device 201, a buffer conductive device 202 and a power strip main body 203. The plug device 201 includes a plurality of pins 2011 and a first surge protective device 2012. The power strip main body 203 includes a second surge protective device 2031 and a plurality of electrical sockets 2032. In this embodiment, the buffer conductive device 202 is a conducting wire covered with insulating material. An end of the buffer conductive device 202 is connected to the plug device 201. The other end of the buffer conductive device 202 is connected to the power strip main body 203. In particular, an end of the buffer conductive device 202 is connected to the first surge protective device 2012 and the other end of the buffer conductive device 202 is connected to the second surge protective device 2031.

Please refer to FIG. 2 again. During operation of the power strip 20, the pins 2011 of the plug device 201 are inserted into a power socket (not shown) for receiving electricity. The electricity offered from the power socket is successively transmitted through the first surge protective device 2012, the buffer conductive device 202, the second surge protective device 2031 and the electrical sockets 2032 to the electrical appliances (not shown) which are electrically connected to the electrical sockets 2032.

When a surge occurs, the surge is inputted into the first surge protective device 2012 of the plug device 201 through the pins 2011. By the first surge protective device 2012, the surge is subject to a first stage suppression. Next, the surge flows through the buffer conductive device 202 such that the buffer conductive device 202 provides a buffer conductive path for delaying the duration of transferring the surge. After the surge is transmitted to the second surge protective device 2031, the second surge protective device 2031 is enabled to perform a second stage suppression on the surge.

Since the surge is sufficiently suppressed by the two-stage suppressions when the surge reaches the electrical sockets 2032, the power strip 20 can meet the requirements of the third edition of UL 1449. That is, the power strip 20 exhibits a clamping voltage less than 330 volts according to the test proposed by the third edition of UL 1449. As a consequence, the surge protective device can prevent the electrical appliances connected to the power strip 20 from being damaged by the surge. It is noted that, however, those skilled in the art will readily observe that numerous modifications and alterations may be made while retaining the teachings of the invention. For example, the concept of using two surge protective devices to suppress the surge in two-stage suppressions can be expanded to three-stage or multi-stage suppressions. Accordingly, the above disclosure should be limited only by the bounds of the following claims.

Figure 1A:
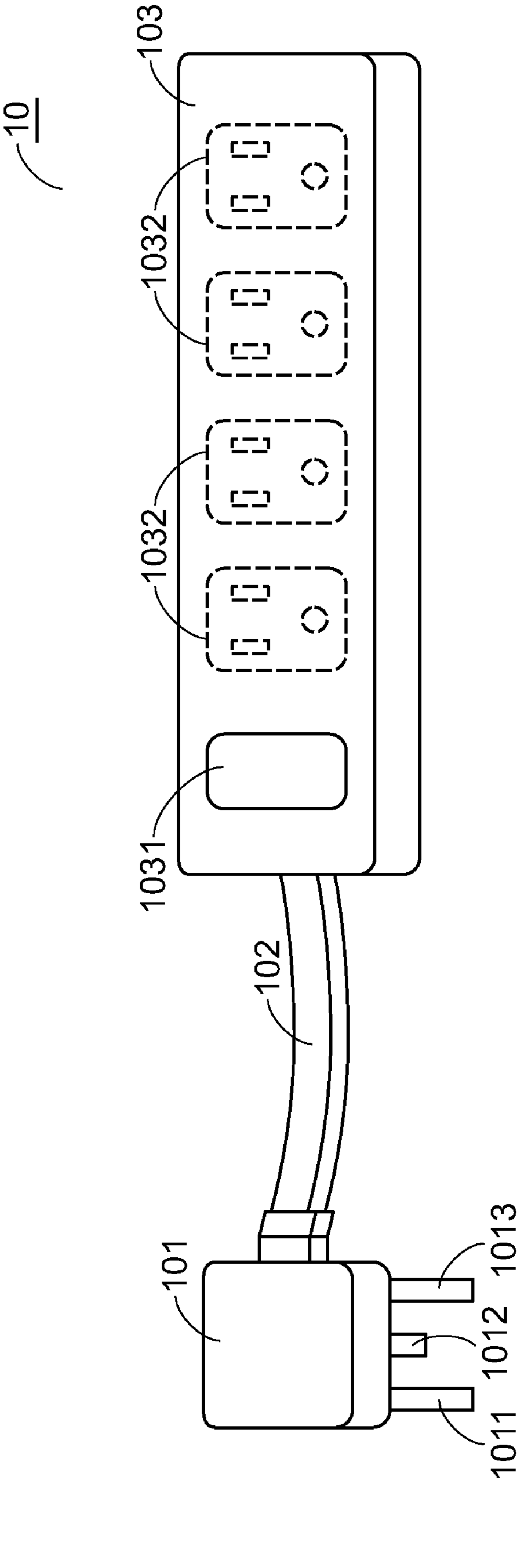
FIG. 1A is a schematic view illustrating a conventional power strip.
Figure 1B:
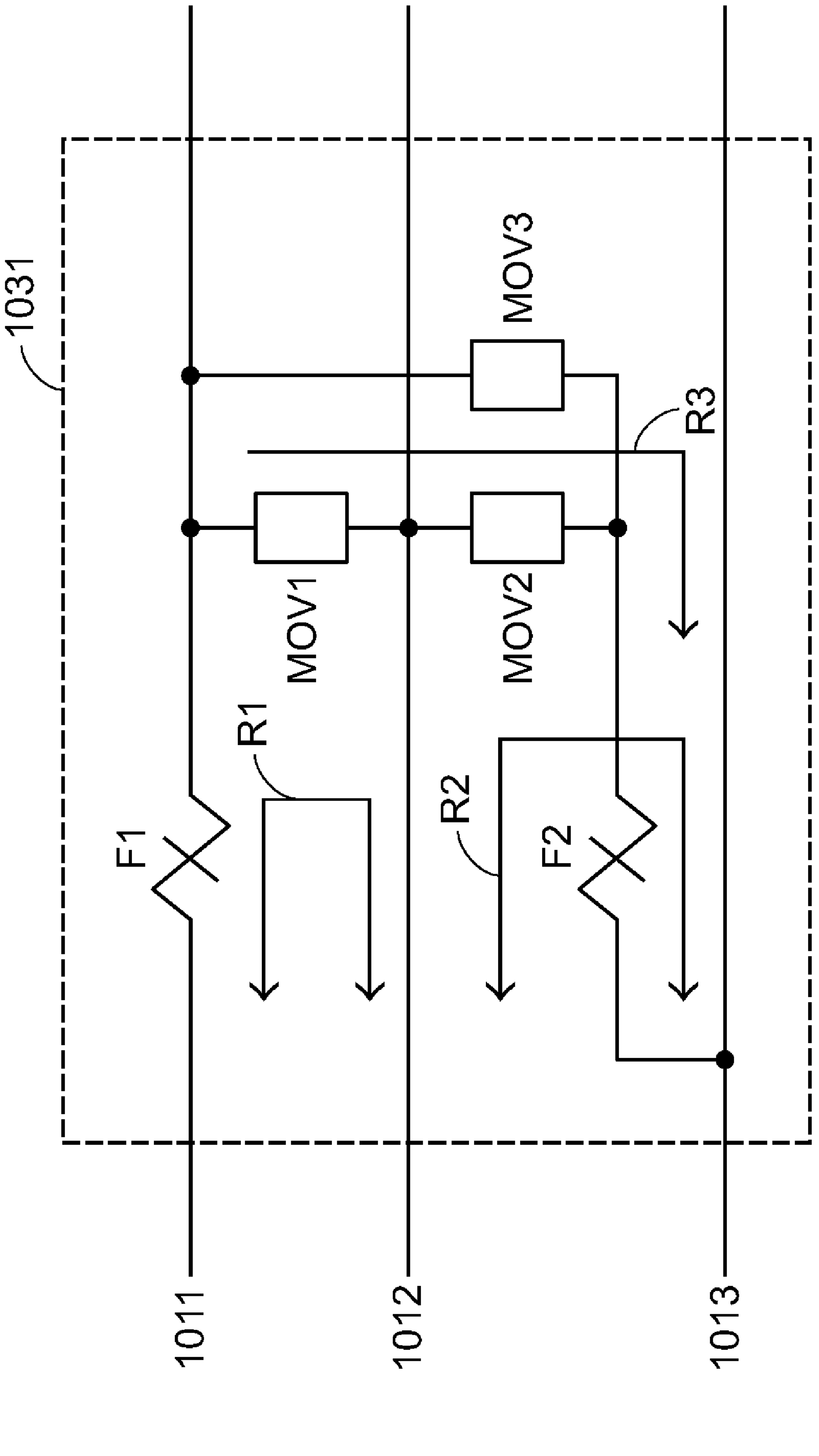
FIG. 1B is a schematic circuit diagram illustrating the surge protective device of the power strip shown in FIG. 1A.

Moreover, any surge protective devices known in the art can be used as the first surge protective device 2012 and the second surge protective device 2031 of the present invention. In views of cost, the surge protective device 1031 of FIG. 1B is feasible. Alternatively, gas discharge tubes (GDTs) or transient voltage suppressors (TVSs) can be used as the first surge protective device 2012 and the second surge protective device 2031.

Figure 3:
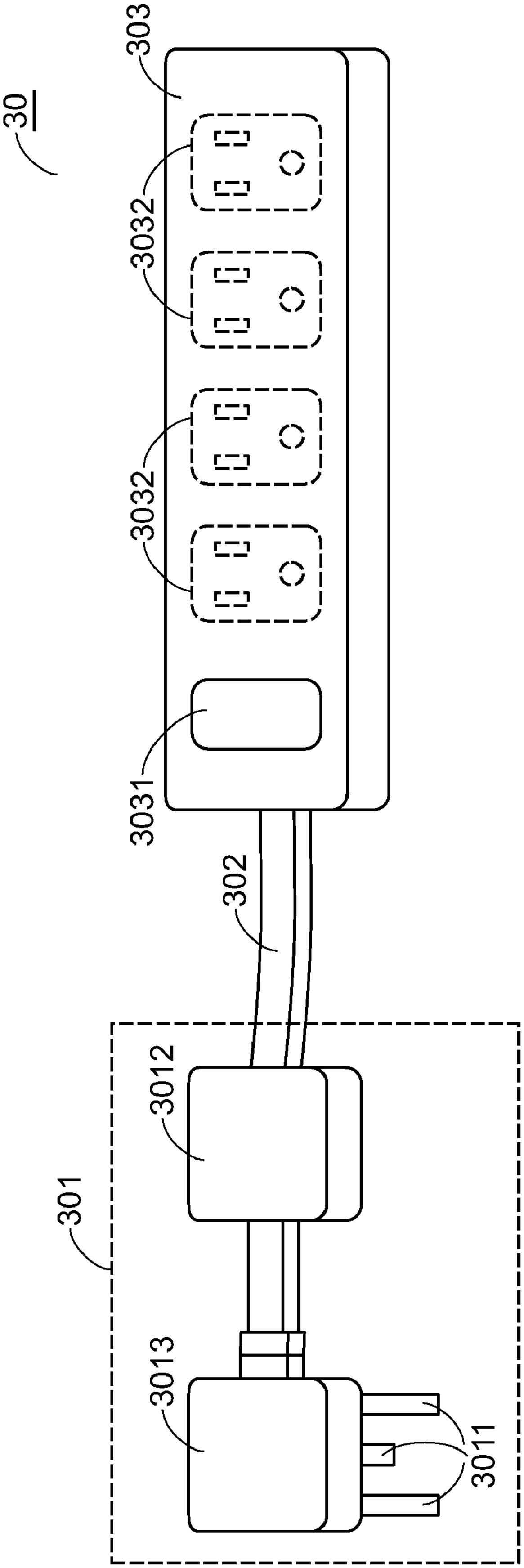
FIG. 3 is a schematic view illustrating a power strip having surge protective devices according to a second preferred embodiment of the present invention.

FIG. 3 is a schematic view illustrating a power strip having surge protective devices according to a second preferred embodiment of the present invention. This embodiment is distinguished from the first preferred embodiment of FIG. 2 in that the plug device 301 includes a plug part 3013 and a first surge protective device 3012. The plug part 3013 includes a plurality of pins 3011. The plug part 3013 is connected to the first surge protective device 3012. The means of connecting the plug part 3013 with the first surge protective device 3012 is not restricted.

When a surge occurs, the surge is inputted into the first surge protective device 3012 through the pins 3011 of the plug part 3013. By the first surge protective device 3012, the surge is subject to a first stage suppression. Next, the surge flows through the buffer conductive device 302 such that the buffer conductive device 302 provides a buffer conductive path for delaying the duration of transferring the surge. After the surge is transmitted to the second surge protective device 3031, the second surge protective device 3031 is enabled to perform a second stage suppression on the surge. Since the surge is sufficiently suppressed by the two-stage suppressions when the surge reaches the electrical sockets 3032, the power strip 30 can meet the requirements of the third edition of UL 1449 exhibiting a clamping voltage less than 330 volts. As a consequence, the electrical appliances connected to the power strip 30 are prevented from being damaged by the surge.

Figure 4:
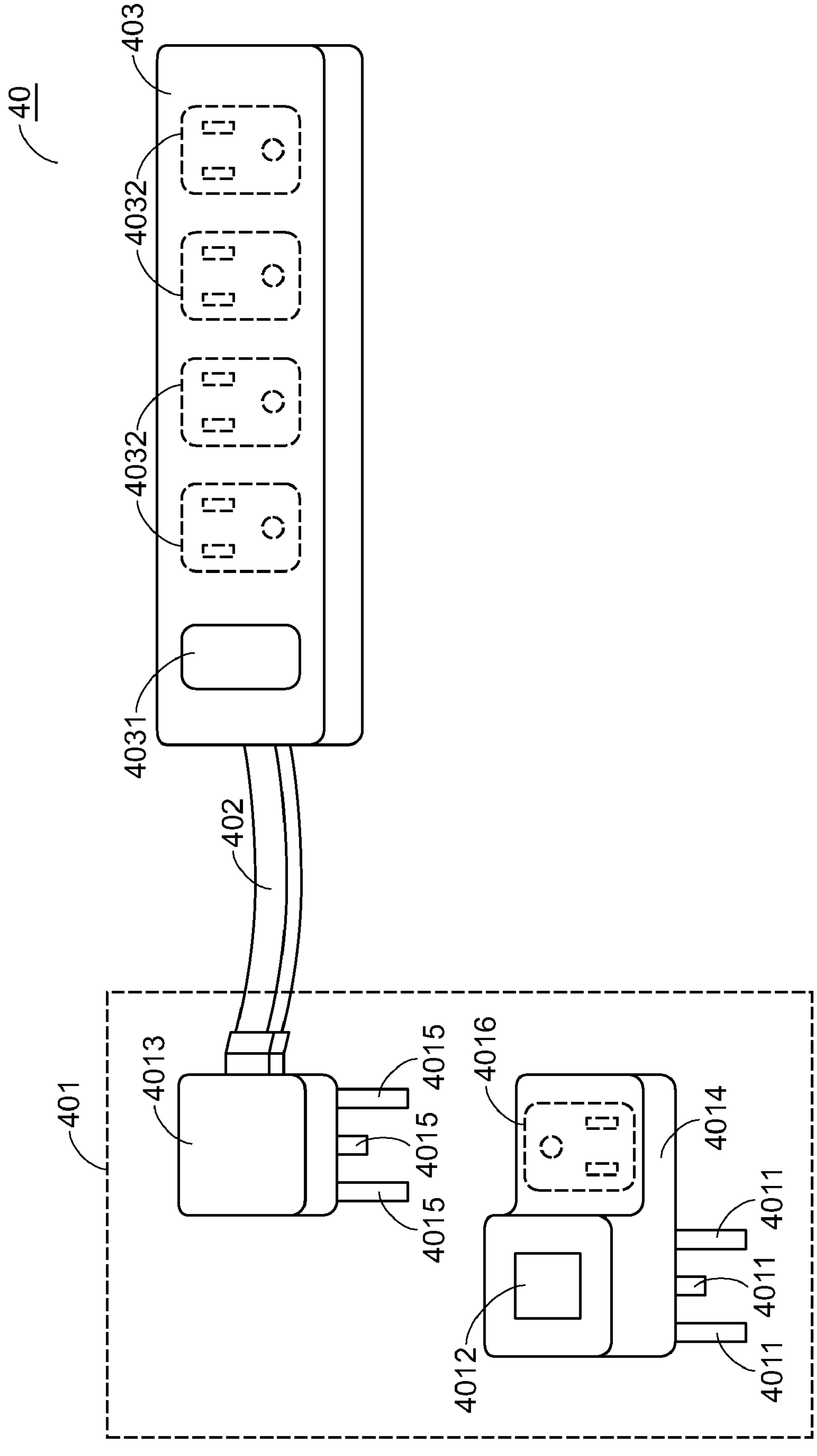
FIG. 4 is a schematic view illustrating a power strip having surge protective devices according to a third preferred embodiment of the present invention.

FIG. 4 is a schematic view illustrating a power strip having surge protective devices according to a third preferred embodiment of the present invention. This embodiment is distinguished from the power strips of FIGS. 2 and 3 in that the plug device 401 includes a first plug part 4013 and a second plug part 4014. The first plug part 4013 includes a plurality of pins 4015. The second plug part 4014 includes a plurality of pins 4011, a first surge protective device 4012 and an electrical socket 4016. The pins 4015 are inserted into the electrical socket 4016 such that the first plug part 4013 is connected to the second plug part 4014. The means of connecting the first plug part 4013 with the second plug part 4014 is not restricted.

When a surge occurs, the surge is inputted into the first surge protective device 4012 through the pins 4011 of the second plug part 4014. By the first surge protective device 4012, the surge is subject to a first stage suppression. Next, the surge flows through the first plug part 4013 and the buffer conductive device 402 such that the buffer conductive device 402 provides a buffer conductive path for delaying the duration of transferring the surge. After the surge is transmitted to the second surge protective device 4031, the second surge protective device 4031 is enabled to perform a second stage suppression on the surge. Since the surge is sufficiently suppressed by the two-stage suppressions when the surge reaches the electrical sockets 4032, the power strip 40 can meet the requirements of the third edition of UL 1449 exhibiting a clamping voltage less than 330 volts. As a consequence, the electrical appliances connected to the power strip 40 are prevented from being damaged by the surge.

As known, the power strips brought to the market should comply with the third edition of UL 1449 when the third edition of UL 1449 is effective. Before the effective date of the third edition of UL 1449, the manufacturers may keep a large reserve of power strips as shown in FIG. 1 and associated fabricating molds. Since the power strip of FIG. 4 is substantially a combination of the conventional power strip shown in FIG. 1 and the second plug part 4014, the manufacturers need only additionally fabricate the second plug part 4014. When the conventional power strip is collocated with the second plug part 4014 for sale, the combination of the conventional power strip and the second plug part 4014 can comply with the third edition of UL 1449. As a result, the power strip as shown in FIG. 4 has benefits in production management and sale.

From the above description, the power strip of the present invention can meet the requirements of the third edition of UL 1449 by two-stage suppressions. In addition, the power strip of the present invention has the advantages of simplified configuration and cost-effectiveness. Moreover, since the conventional surge protective device can be employed, the power strip of the present invention is cost-effective and has enhanced industrial utility.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A power strip having surge protective devices for suppressing a surge and protecting an electrical appliance which is connected to said power strip, said power strip comprising:

a plug device comprising a plurality of pins to be inserted into a power socket and a first surge protective device for initially suppressing said surge;

a buffer conductive device having an end connected to said first surge protective device for providing a buffer conductive path for delaying the duration of transferring said surge; and a power strip main body comprising a second surge protective device and a plurality of electrical sockets, wherein said plurality of electrical sockets are connected to said electrical appliance, and the second surge protective device is connected to the other end of said buffer conductive device for receiving and further suppressing said surge.

2. The power strip according to claim 1 wherein said buffer conductive device is a conducting wire covered with insulating material.

3. The power strip according to claim 2 wherein said plug device comprises a plug part and said first surge protective device, wherein said plug part is connected to said first surge protective device, and said plug part contains said plurality of pins.

4. The power strip according to claim 2 wherein said plug device comprises a first plug part and a second plug part, wherein said first plug part is connected to said second plug part, and said second plug part contains said plurality of pins and said first surge protective device.

5. The power strip according to claim 1 wherein said first surge protective device is a metal oxide varistor (MOV), a gas discharge tube (GDT) or a transient voltage suppressor (TVS).

6. The power strip according to claim 1 wherein said second surge protective device is a metal oxide varistor (MOV), a gas discharge tube (GDT) or a transient voltage suppressor (TVS).

* * * * *